United States Patent [19]

Jentoft et al.

[11] E Patent Number: Re. 32,539

[45] Reissued Date of Patent: Nov. 10, 1987

[54] SKYLIGHT CONSTRUCTION

[75] Inventors: Arthur P. Jentoft, Kennebunkport; Paul A. Couture, Emery Mills, both of Me.

[73] Assignee: Wasco Products, Inc., Sanford, Me.

[21] Appl. No.: 846,710

[22] Filed: Apr. 1, 1986

Related U.S. Patent Documents

Reissue of:

[64] Patent No.: 4,439,962
Issued: Apr. 3, 1984
Appl. No.: 175,306
Filed: Aug. 4, 1980

U.S. Applications:

[63] Continuation-in-part of Ser. No. 923,245, Jul. 10, 1978, abandoned.

[51] Int. Cl.[4] ..... E04B 7/18
[52] U.S. Cl. ..... 52/200; 49/DIG. 1
[58] Field of Search ..... 52/200; 49/DIG. 1

[56] References Cited

U.S. PATENT DOCUMENTS

| | | | |
|---|---|---|---|
| 1,656,044 | 1/1928 | Cibulas | 52/200 X |
| 3,005,291 | 10/1961 | Huber | 52/200 X |
| 3,034,260 | 5/1962 | Wasserman | 52/200 X |
| 3,417,522 | 12/1968 | Kiekhaefer | 52/200 X |
| 3,969,858 | 7/1976 | Naidus | 52/200 X |
| 4,073,097 | 2/1978 | Jentoft et al. | 52/200 X |
| 4,114,330 | 9/1978 | Sukolics | 52/200 |
| 4,123,883 | 11/1978 | Barber, Jr. et al. | 52/200 |
| 4,128,934 | 12/1978 | Doring | 49/DIG. 1 X |
| 4,193,237 | 3/1980 | Jankowski | 52/200 |
| 4,275,526 | 6/1981 | Abramson | 49/DIG. 1 |

FOREIGN PATENT DOCUMENTS

| | | | |
|---|---|---|---|
| 2060750 | 5/1981 | United Kingdom | 49/DIG. 1 |

*Primary Examiner*—Carl D. Friedman
*Attorney, Agent, or Firm*—Wolf, Greenfield & Sacks

[57] ABSTRACT

The skylight may be of the domed-type or flat type and of single or double glass (acrylic or other transparent or translucent plastic) construction. The skylight fits within an opening in a roof or the like and has a peripheral curb of aluminum or the like material which is fixed to the roof construction about the opening. The curb member or frame at its top receives a flexible thermoplastic (such as PVC) gasket compressible against the edge of the glass or plastic dome or panel. In accordance with one embodiment of the invention the frame may be constructed of a material such as PVC, in which case the top gasket may be integral with the frame or curb. In this case there may also be a second flexible thermosplastic gasket adapted to contact a retainer secured to the curb for retaining the dome or panel on the curb. In another embodiment of the invention the frame or curb may be constructed of aluminum or the like having a thermal bridge associated with the frame to minimize the transfer of heat from one side of the frame extrusion to the other. The frame may also have associated therewith stops extending upwardly for limiting the position of the domes or panels. These stops are useful in transportation of the unit and also when the unit is to be installed on a slanted roof.

18 Claims, 5 Drawing Figures

SKYLIGHT CONSTRUCTION

Matter enclosed in heavy brackets [ ] appears in the original patent but forms no part of this reissue specification; matter printed in italics indicates the additions made by reissue.

RELATED APPLICATION

This is a continuation-in-part of application Ser. No. 923,245 filed July 10, 1978, now abandoned.

BACKGROUND OF THE INVENTION

The present invention relates in general to an improved skylight construction, and is concerned, more particularly, with an improved curb frame construction characterized by an improved resistance to thermal transfer of heat through the skylight.

The co-pending application Ser. No. 923,245 shows different constructions for a skylight employing a curb frame constructed of a relatively rigid thermoplastic material such as polyvinylchloride. However, for some applications it is desirable to maintain a more rigid curb frame such as one constructed primarily of aluminum. It is, therefore, one intended object of this invention to provide a skylight construction having a curb frame constructed in aluminum and which is yet characterized by a thermal bridge associated with the frame for minimizing heat transfer through the skylight.

One object of the present invention is to thus provide improved skylight construction having a curb frame that may be constructed of a metal material such as aluminum and which is yet provided with a thermal bridge associated with the frame.

Still another object of the present invention is to provide an improved skylight curb frame construction combining a curb of a rigid material which may either be aluminum, some other metal, or a very rigid polyvinylchloride, in combination with a flexible thermoplastic material forming one or more gaskets for sealing the curbed frame to, for example, the dome or panel associated therewith.

Still another object of the present invention is to provide a skylight construction that is characterized by being energy-saving.

As depicted in co-pending application Ser. No. 923,245, there is a securing screw or bolt for securing the dome to the frame by means of a retainer. When the skylight is transported, especially with a flat plate construction, the dome may shift and engage the bolt or screw causing a cracking or damage to the dome.

Accordingly, another object of the present invention is to provide stop means associated with the frame for limiting the position of the dome relative to the frame and preventing damage to the dome or plate forming the skylight. The stop means are also useful in connection with installation of the skylight on a slanted roof.

SUMMARY OF THE INVENTION

To accomplish the foregoing and other objects of the invention, there is provided a skylight construction adapted to be fitted into an opening in a building such as the roof of a residential house. This skylight construction comprises a curb frame extending about the opening and having a means for receiving nails or the like for securing the frame in place about the opening. In one embodiment, one, two or more transparent or translucent thermoplastic domes cover the opening and extend at the edge to the curb frame. In another embodiment the dome is replaced by one, two or more glass panels. A retainer extends about the periphery of the skylight for holding the dome or panel on the curb frame. In the disclosed embodiments the curb frame may be constructed either of a rigid plastic, such as polyvinylchloride (PVC), or it may be constructed of a rigid metal such as aluminum. However, the preferred construction in accordance with this invention is of aluminum in combination with a thermal bridge which essentially forms a thermal break in the aluminum frame extrusion. The thermal bridge may be provided by having grooves in the aluminum extrusion which are filled with a plastic which may be urethane. After the plastic hardens, the extrusion is saw cut along the bottom of the groove to interrupt the continuity of the aluminum. The plastic thus provides the structural continuity and any transfer of heat from one side of the extrusion to the other must pass through the lower heat transmitting plastic thermal bridge.

In accordance with another feature of the present invention the frame is of a construction different from that shown in co-pending application Ser. No. 923,245 so as to permit the use of a thinner upright wall (wall 12 in Ser. No. 923,245). Also, the frame construction accommodates the well liner (liner 14 in Ser. No. 923,245) beneath the extrusion thus making for a somewhat more compact construction.

In either embodiment; that is one employing a plastic curb frame or one employing a metal curb frame, there are provided preferably a series of stops associated with the frame and extending upwardly therefrom essentially placed between the frame and the retainer secured thereabove. These stops are useful in the transportation of these skylights to prevent damage to the dome and are also useful in preventing damage when the skylight is to be installed on a slanted roof.

BRIEF DESCRIPTION OF THE DRAWINGS

Numerous other objects, features and advantages of the invention should now become apparent upon a reading of the following detailed description taken in conjunction with the accompany drawings, in which.

DETAILED DESCRIPTION

Figure 1:
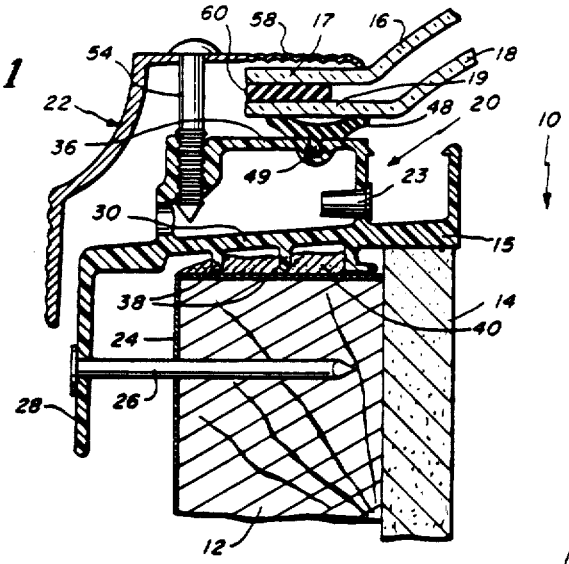
FIG. 1 is a cross-sectional view of a domed skylight construction through a section of the curb frame.
Figure 2:
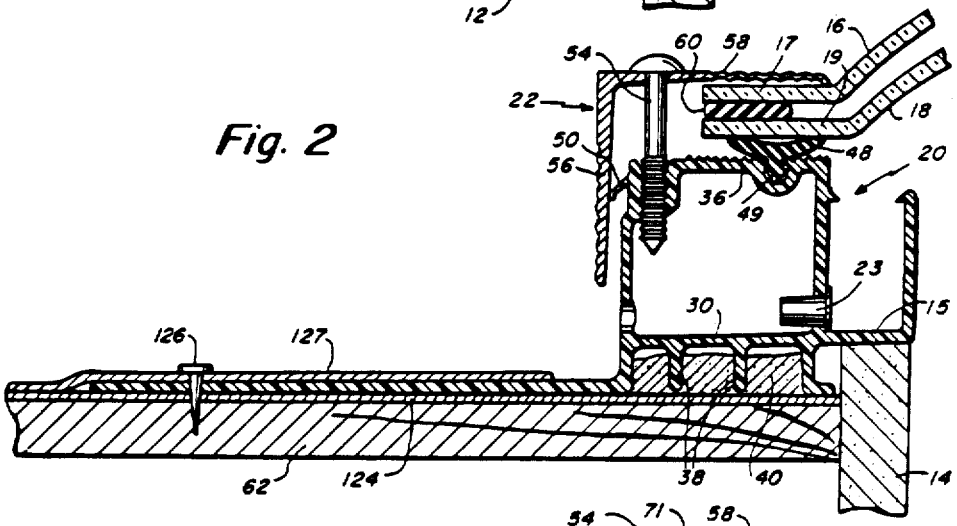
FIG. 2 is a cross-sectional view like the one shown in FIG. 1 for a different configuration frame.
Figure 3:
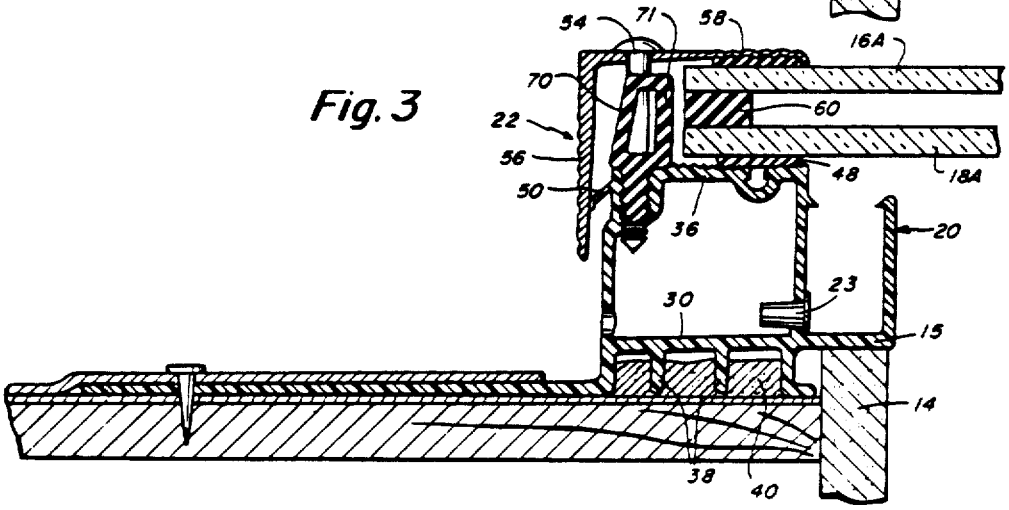
FIG. 3 is a cross-sectional view substantially the same as the one shown in FIG. 2 and also showing the stop means of the invention.

Referring now to the drawings, some of the embodiments show the dome skylight such as in FIGS. 1 and 2 while some of the other embodiments such as shown in FIG. 3 depict a flat skylight construction.

The skylight construction spans an opening 10 which may be a square or rectangular shape and defined in part by upright walls 12. A finish material or well liner 14 is provided on the inside of the opening 10. In accordance with the present invention it is preferred that liner 14 extend to a bottom wall 15 of the curb frame 20.

In FIGS. 1-3, like reference characters are used to identify similar components. In FIG. 1 the curb frame 20 is construced of aluminum. In FIGS. 2 and 3 the curb frame is constructed of a plastic such as PVC. In FIG. 1 the skylight construction includes a pair of domes 16 and 18 which are preferably acrylic thermoplastic domes, a curb frame 20 of aluminum and a retainer 22 which may also be constructed of aluminum.

FIGS. 1-3 show a plug 23 which can be removed if condensation drainage is required. The holes are plugged with the plug 23 to prevent energy loss due to air exfiltration. In FIG. 1 about the wall 12 there may be provided a flashing or roofing felt strip 24 which extends along the outer surface of the wall and about the top thereof depicted in FIG. 1. The curb frame 20 may be extruded in straight sections and is secured to the top of the wall 12 over the flashing strip 24. The curb frame 20 may be secured to the wall 12 by means of a number of nails 26 which extend through the flange 28 of the curb frame 20. The curb frame also has a sealing gasket 48 received at the upper horizontal wall 36 of the curb frame. The wall 36 has an open channel for receiving a ridge 49 of the cup-shaped gasket 48. The bottom wall 30 of the frame may have nipples 38 to provide means for embedding in mastic. The mastic 40 may be laid between the flashing strip 24 and the base wall 30.

The curb frame also has an internally threaded recess which receives the bolt 54 used for securing the retainer 22 to the curb frame 20. In the embodiments of FIGS. 2 and 3 it is noted that, wherein the frame is constructed in PVC there is provided a further gasket 50 as taught in our copending application Ser. No. 923,245. The gasket 50 may be slightly deflected in seals against the wall 56 of the retainer. The top wall 58 of the retainer presses against the edges 17 and 19 and the edge 19 rests upon the cup shaped gasket 48 which compresses to seal against the dome. A single dome may be sufficient for certain applications and in such case the seal 60 between domes is, of course, not necessary. In the embodiment of FIG. 3 wherein the dome is essentially a flat panel it is noted that these are identified by reference characters 16A and 18A to denote this difference in form of the domes. With regard to the embodiments shown in FIGS. 2 and 3 these are primarily adapted for use with a flat surface 62. In this connection there may be provided a layer 124 which extends over the top surface of the member 62 which may be a roof sheating. There may be provided a number of nails such as the nail 126 shown in FIG. 2. A final roofing layer 127 may also be used in association with providing a tight seal between the skylight construction and the roof to which it is affixed.

FIG. 3 shows one important feature of the present invention in the form of a stop 70 which may be used essentially in place of one of the bolts 54. The stop 70 may be screwed into the accommodating recess previously meant for the bolt or it can be driven into the screw groove or hole for the bolt 54. It is preferred that the stops 70 be provided with at least two per side of the frame. In the case of transportation of the skylight prior to its being installed these stops are helpful in preventing the panels such as domes 16 and 18 from contacting the bolts 54. It is noted in this connection that the side 71 of the stop 70 extends beyond the bolt 54 so that there would be contact with the stop prior to any contact with the bolt 54. These stops are also helpful in connection with installation of the skylight on a slanted roof where the panels may apt to slide when being installed or might tend to slide after a period over which they have been installed. The stops 70 preferably have a flat side facing the panels and are preferably constructed of a plastic such as PVC. Contact with the stops would not damage the panels in any way.

Figure 4:
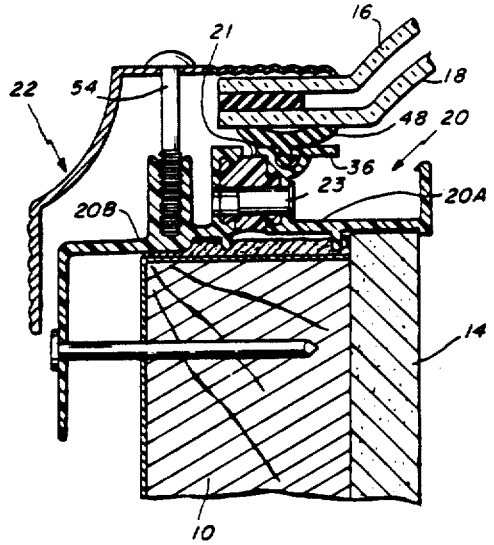
FIG. 4 is a cross-sectional view of an alternate embodiment of the invention using the thermal bridge.
Figure 5:
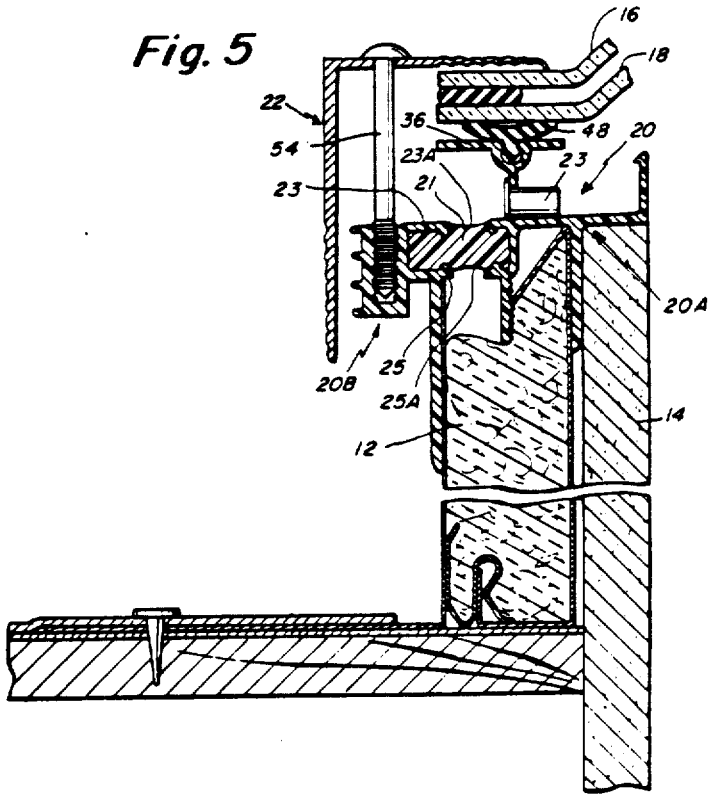
FIG. 5 is an alternate cross-sectional view of the thermal bridge version of the invention.

FIGS. 4 and 5 show two further embodiments of the present invention both employing the thermal bridge concept of the present invention. In FIGS. 4 and 5 reference characters are used like those employed in identifying like components in FIGS. 1-3. Thus, in FIGS. 4 and 5 there is shown the upright wall 12, the well liner 14, the curb frame 20, and the retainer 22. As is apparent in FIGS. 4 and 5 the curb frames 20 are of different overall extruded configuration and also differ from the configurations shown in FIGS. 1-3. However, the curb frames are similar in that in FIGS. 4 and 5 they include means defining an internally threaded passage for receiving the bolts 54 which are used for securing the retainer 22 to sandwich the domes 16 and 18 between a wall of the retainer and the gasket 48 supported by a section of the curb frame. FIGS. 4 and 5 also show plugs 23.

Each of the frames in FIGS. 4 and 5 includes an inner section 20A and an outer section 20B bridged by means of the thermal bridge 21. The section 20A is the section from which the gasket 48 is supported such as from the wall 36. Again, the gasket 48 includes a lower ridge 49 accommodated by a channel in the wall 36. The outer section 20B of the frame is for supporting the bolts 54.

The facing section of ends 20A and 20B as depicted, for example, in FIG. 5 form a cavity of somewhat rectangular form. In FIGS. 4 and 5 the frame is shown in its final configuration. The thermal bridge 21 may be formed by first providing a groove in the aluminum extrusion such as in the wall 23. The cavity can then be filled with a plastic such as urethane. After the plastic hardens, the extrusion may then be saw cut along the bottom of the groove so as to break the continuity of the aluminum. This saw cut can be made in the wall 25 with the cuts in walls 23 and 25 defining grooves 23A and 25A as depicted clearly in FIG. 5. A similar technique can also be used in connection with the fabrication of the curb frame of FIG. 4. After the plastic in the cavity hardens and the lower cut is made in the aluminum extrusion there is a structural continuity but essentially a structural discontinuity as far as heat transfer is concerned as the heat must pass from one side of the extrusion to the other through the much lower heat transmitting plastic thermal barrier.

In the embodiments shown in FIGS. 4 and 5 with the use of an aluminum extrusion for the frame there are mitre cuts at the corners of the frame which are usually welded in a conventional manner. However, the plastic forming the thermal barrier cannot be welded and thus a caulking is used to complete the seal along the mitre. For one version a narrow joint seam sealant is used while for another version one may use a "hot melt" butyl to seal the exposed mitre. The "hot melt" sealant hardens almost instantly as it cools to allow immediate handling.

What is claimed is:

1. A skylight construction for an opening in a building comprising:

a curb frame extending about the opening and having means for securing the frame in a fixed position about the opening, said curb frame being of heat conductive material and having an inner section and an outer section, transparent or translucent means covering the opening and extending at its edges to the curb frame, means over the frame for retaining the covering means to the curb frame, gasket means carried by said inner section of said curb frame, means for securing said retaining means to said outer section of said curb frame to sandwich said transparent or translucent means between a portion of said retaining means and said gasket means, and a low heat conductive plastic bridge disposed between said outer section and said inner section of said curb frame for impeding heat transfer through the curb frame, said curb frame inner section and said curb frame outer section including respective facing walls, each having interlocking surfaces adapted to hold said plastic bridge in a position adjacent said gasket means and underlying said transparent or translucent means, said curb frame having means supporting said gasket means by and over one of said facing walls.

2. A skylight construction as set forth in claim 1 wherein said curb frame has a cavity defined between sections for accommodating the bridge.

3. A skylight construction as set forth in claim 1 wherein said means for supporting said gasket means includes interlocking means therebetween.

4. A skylight construction as set forth in claim 1 wherein said gasket means is supported over and by said curb frame inner section facing wall.

5. A skylight construction as set forth in claim 1 including means defining a condensation gutter in the inner section of the curb frame.

6. A skylight construction as set forth in claim 5 wherein said condensation gutter is defined in part by the facing wall of the inner section of the curb frame.

7. A skylight construction as set forth in claim 1 wherein said means for securing the retaining means includes a bolt and associated bolt retainer disposed in the outer section of the curb frame.

8. A skylight construction as set forth in claim 1 including a downwardly directed end of the outer section of the curb frame.

9. A skylight construction as set forth in claim 1 wherein said curb frame inner and outer sections have respective base walls with the inner section base wall in part defining a condensation gutter and the outer section base wall having means in part defining the means for securing the retaining means.

10. A skylight construction as set forth in claim 9 including respective facing walls of the inner and outer curb frame sections each extending from a respective base wall and holding therebetween the plastic bridge.

11. A skylight construction as set forth in claim 1 including stop means mounted outside of but adjacent at least one edge of the covering means.

12. A skylight construction as set forth in claim 1 wherein said means supporting said gasket means comprises a substantially horizontal wall having an open channel for receiving a ridge of the gasket means.

13. A skylight construction as set forth in claim 1 wherein said means supporting said gasket means includes a substantially vertical wall having a drainage hole therein and in part defining a condensation gutter.

14. A skylight construction as set forth in claim 1 wherein said means supporting said gasket means is an integral extension of one of said facing walls having an open channel for receiving a ridge of the gasket means.

15. A skylight construction as set forth in claim 14 wherein there is provided a passage hole both through said facing walls and said plastic bridge so as to provide drainage through the construction.

*16. A skylight construction for an opening in a building comprising:*

*a curb frame extending about the opening and having means for securing the frame in a fixed position about the opening, said curb frame being of heat conductive material and having an inner section and an outer section,*

*transparent or translucent means covering the opening and extending at its edges to the curb frame,*

*means over the frame for retaining the covering means to the curb frame,*

*gasket means carried by said curb frame,*

*means for securing said retaining means to said curb frame to sandwich said transparent or translucent means between a portion of said retaining means and said gasket means, and*

*a low heat conductive plastic bridge disposed between said outer section and said inner section of said curb frame for impeding heat transfer through the curb frame,*

*said curb frame inner section and said curb frame outer section including respective facing walls, each having interlocking surfaces adapted to hold said plastic bridge in a position adjacent said gasket means and underlying said transparent or translucent means,*

*said curb frame having means supporting said gasket means by and over one of said facing walls.*

*17. A skylight construction as set forth in claim 16 wherein said gasket means is carried by the inner section of the curb frame.*

*18. A skylight construction as set forth in claim 16 wherein said retaining means is secured to said outer section of said curb frame.*

* * * * *